March 7, 1967  G. S. PLEISS  3,307,813
SUPPORT FOR CHRISTMAS TREES AND THE LIKE
Filed Feb. 15, 1965  2 Sheets-Sheet 1
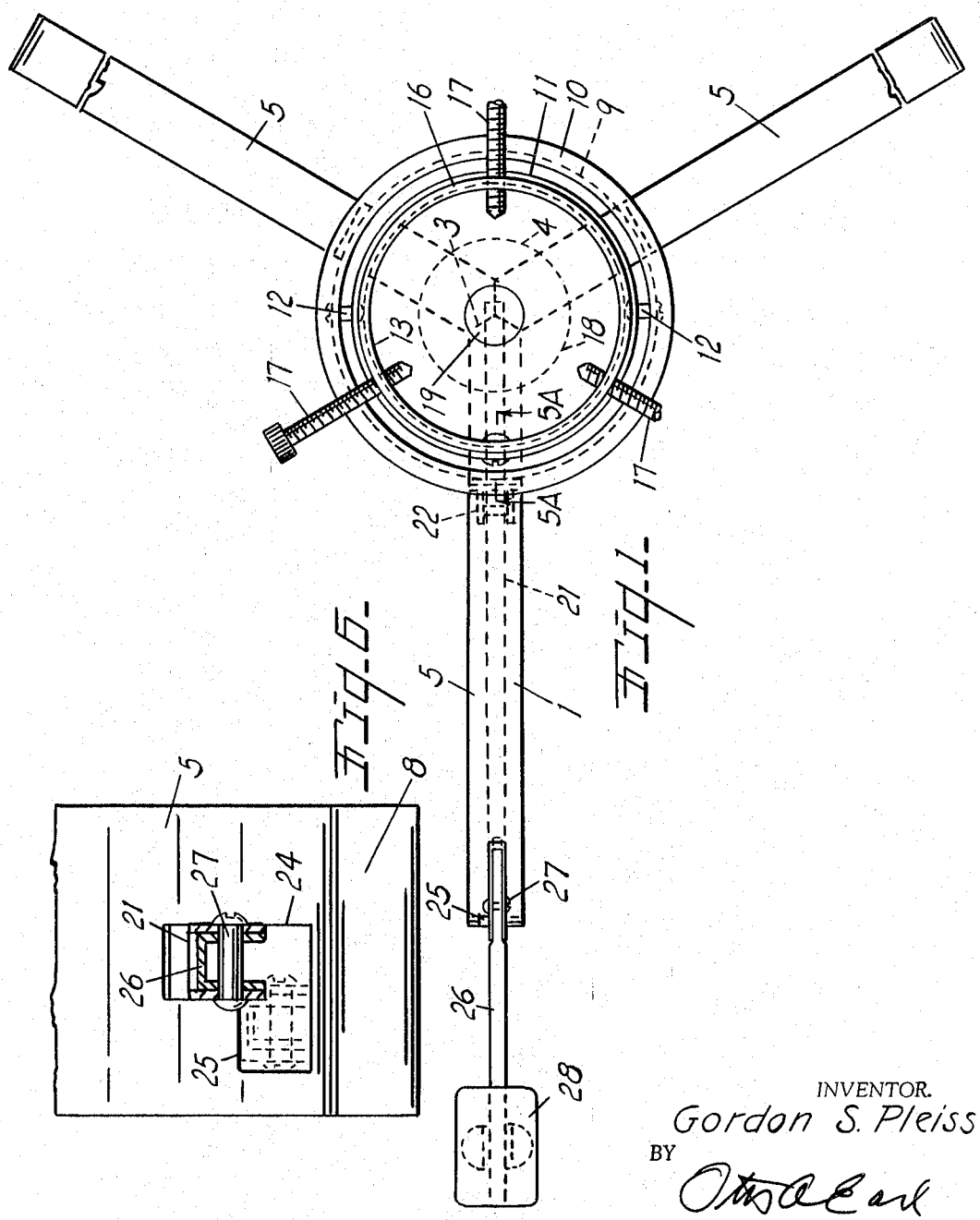
INVENTOR.
Gordon S. Pleiss
BY
ATTORNEY

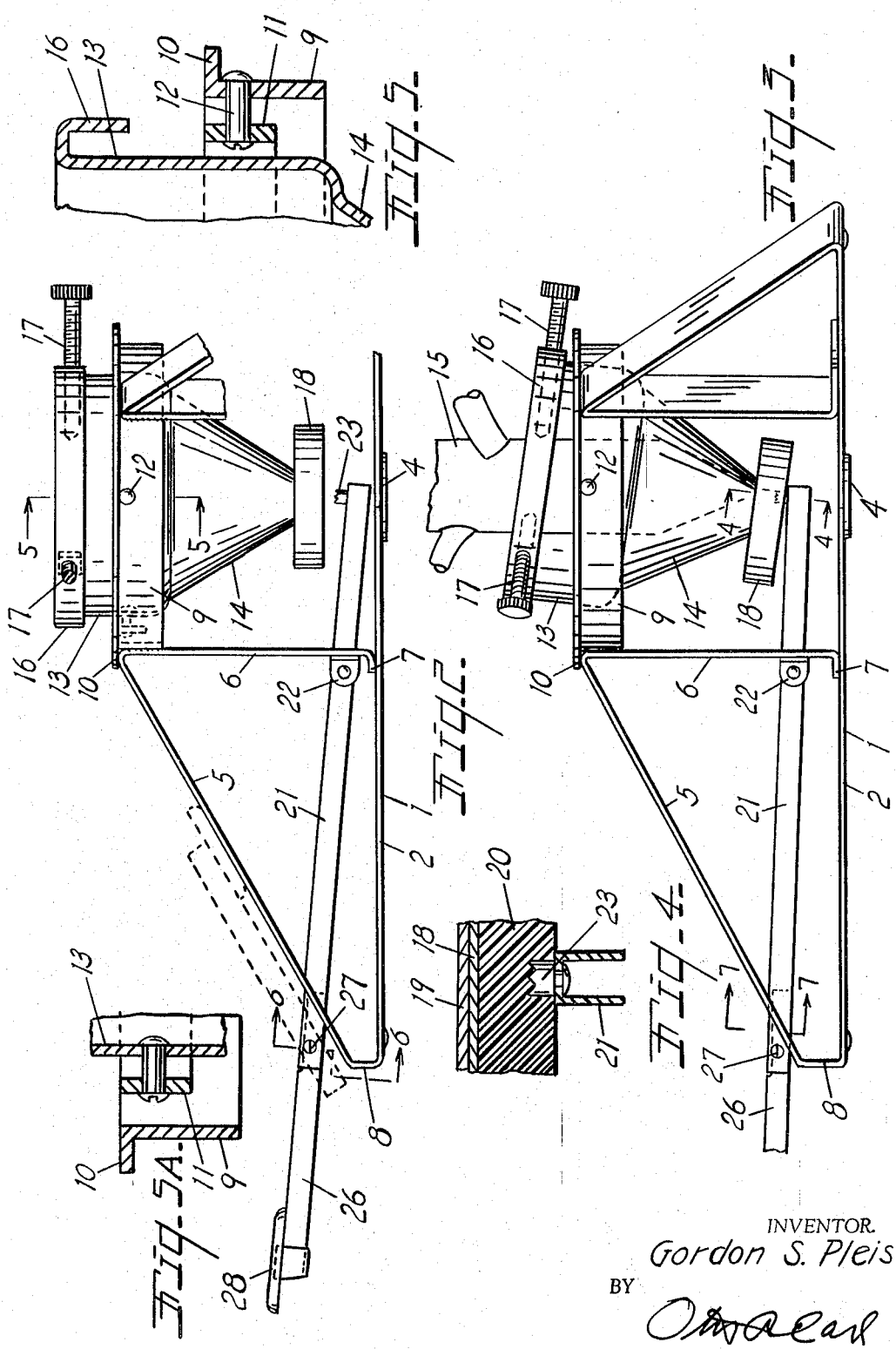

United States Patent Office 3,307,813
Patented Mar. 7, 1967

3,307,813
SUPPORT FOR CHRISTMAS TREES AND
THE LIKE
Gordon S. Pleiss, Ludington, Mich., assignor to Handy Things Manufacturing Company, Ludington, Mich.
Filed Feb. 15, 1965, Ser. No. 432,720
13 Claims. (Cl. 248—44)

This invention relates to a holder or stand adapted as a support for Christmas trees and the like. The main objects of this invention are, First, to provide a holder or stand adapted for use as a support for Christmas trees and the like, which has a wide range of adjustment to adapt it to trees of different sizes and shapes and so that they may be supported in upright position.

Second, to provide a stand or support for Christmas trees and the like which may be quickly adjusted to support the trees in upright position with the operator in standing position for the manipulation of the tree to an upright position.

Third, to provide a holder having these advantages which is adapted for supporting trees of a wide range of sizes and shapes.

Fourth, to provide such a holder which may be formed of relatively light stock and at the same time is strong and capable of supporting trees or the like of substantial size and weight.

Objects relating to details and economies of the invention will appear from the description to follow. The invention is defined and pointed out in the claims. A preferred embodiment of the invention is illustrated in the accompanying drawing, in which:

FIG. 1 is a top view of a structure embodying my invention, portions of two of the legs and of the tree clamping screws being broken away.

FIG. 2 is a fragmentary elevational view with the anchoring means shown in retracted position by full lines, its collapsed position being shown by dotted lines.

FIG. 3 is a fragmentary side elevation view the lower fragment of a tree being indicated and the support being illustrated in one adjusted position.

FIG. 4 is an enlarged fragmentary view partially in vertical section on a line corresponding to line 4—4 of FIG. 3.

FIG. 5 is an enlarged fragmentary view on a line corresponding to line 5—5 of FIG. 2, illustrating some of the structural details of the mounting for the holder member.

FIG. 5A is an enlarged fragmentary view on a line corresponding to line 5—5 of FIG. 1 illustrating other structural details of the mounting for the holder member.

FIG. 6 is an enlarged fragmentary view on a line corresponding to line 6—6 of FIG. 2 illustrating certain details of the adjusting lever and of the keeper unit.

The embodiment of my invention illustrated comprises a plurality of radially disposed frame members 1 formed of bendable strip-like stock of flat cross section and including horizontally disposed base portions 2 having angled inner end portions 3 disposed in meshing interlocking engagement, as is illustrated by dotted lines in FIG. 1, which are disposed upon and fixedly secured to the disk-like coupling member 4. These frame members have upwardly and inwardly projecting integral leg portions 5 which terminate at their inner ends in downwardly projecting struts 6, the lower end 7 of which are fixed secured to the base portions 2 desirably by welding, the welds not being illustrated. This provides a rigid supporting frame which may be formed of relatively light stock. One of the leg members has an upright portion 8 at its outer end, the purpose of which will be later described.

The annular frame member 9 has an outwardly projecting flange 10 at its upper end. This frame member is fittingly supported within the upright portions of the leg members and is fixedly secured thereto with the flange portion thereof in overlapping relation to the inner ends of the leg members. With the parts thus arranged, the body structure may be formed of relatively light stock, but it is capable of supporting relatively heavy loads.

The annular holder support member 11 is pivotally mounted at 12 on the frame member 9. The tree or article support member includes an upper cylindrical portion 13 and a downwardly tapered portion 14 adapted to receive the lower end of the trunk of a tree or the like, conventionally illustrated in FIG. 3 at 15. This holder member is pivotally or tiltably mounted on the support member 11, the pivots being located in 90° angular relation to the pivots 12. The upper end of this holder member projects substantially above the support member 11, and in the embodiment illustrated, terminates at an outwardly and downwardly projecting flange 16 which serves as a reinforcing member and also as a support for the tree clamping screws 17, the embodiment illustrated having three of such screws. In view of the holder member having the downwardly tapered portion 14 and these clamping screws, the tree or other supported object may be very effectively secured in the holder.

It will be appreciated that Christmas trees and the like vary greatly in the shape of their trunk portions and that it is desirable in use that they be supported in upright position. To that end, there is provided means for securing the support or holder in a wide variety of angular positions, one of which is illustrated in FIG. 3. There is also provided a downwardly facing clutch member, designated generally by the numeral 18, which is fixedly secured to the bottom 19 of the holder member. This member 18 is of downwardly facing dish shape disposed in inverted position and includes resiliently yieldable clutch material 20, certain grades of rubber being usable.

In the embodiment illustrated, the anchoring means includes the lever 21 which is pivotally mounted on ears 22 on one of the legs 6. The lever is provided with an upwardly projecting prong 23 engageable with the yielding material in the clutch member, as is illustrated in FIG. 4.

In the embodiment illustrated, the lever projects through an opening 24 in one of the leg members, as is illustrated in the drawing, there being a keeper portion 25 opening to the lower end of the opening 24. The lever is laterally swingable sufficiently to allow it to be engaged with the keeper, as is illustrated by dotted lines in FIG. 6. The actuating lever includes an outer section or portion 26 which is pivotally secured to the inner section at 27 so that it may be adjusted to extended use position as illustrated in FIGS. 2 and 3, or in collapsed position as illustrated by dotted lines in FIG. 2. This lever section 26 is desirably provided with a footpiece 28 at its outer end. With the parts thus arranged, the user adjusts the portion 26 of the anchoring lever to the position shown in full lines in FIGS. 1, 2 and 3 and he places the tree or object to be supported, conventionally illustrated at 15 in FIG. 3, in the holder and clampingly secures it by means of the screws 17. The tree and its support are then adjusted to position the tree in upright position, and that may be done while the user is in standing position. When adjusted to that position the operator, desirably by placing a foot on the footpiece 28, actuates the anchoring lever to engage its prong 23 with the yieldable material 20 of the clutch member mounted on the lower end of the holder, and the actuating lever is shifted sidewise into retaining engagement with the keeper, as is illustrated by dotted lines in FIG. 6. The tree is thus supported in upright position. The section 26 of the lever may then be adjusted to collapsed position as shown by dotted lines in FIG. 2. It will also be understood that it is adjusted to that position when the structure is to be stored. With this arrangement of parts, trees having trunks of widely varying shapes and sizes may be effectively supported to support the tree in upright position, and this may be accomplished with the operator in standing position, which facilitates the proper positioning of the tree.

I have illustrated and described one highly practical embodiment of my invention and one which may be made of relatively light stock, the various elements of which are in reinforcing bracing relation to each other. I have not attempted to illustrate or describe other modifications or adaptations of my invention, as it is believed that this disclosure will enable those skilled in the art to embody or adapt my invention as may be desired.

What is claimed as new is:

1. A support for Christmas trees and the like comprising a plurality of radially disposed frame members formed of bendable strip-like stock of flat cross section and including horizontally disposed base portions having angled inner end portions disposed in interlocking engagement and having upwardly and inwardly projecting leg portions terminating at their inner ends in downwardly projecting struts which are supportedly secured to the upper sides of the base portions in outwardly spaced relation to the inner ends thereof, the inner ends of said base portion being disposed upon and fixedly secured to a coupling member, an annular frame member disposed within and fixedly secured to the upper ends of said leg portions of said frame members and having an outwardly projecting flange overlapping the upper ends thereof, an annular holder support member disposed within said annular frame member and pivotally connected thereto to permit its tilting adjustment, an article holder member having a cylindrical upper portion terminating at its upper end in an outwardly and downwardly projecting flange disposed in vertically spaced relation to said holder support member, said holder member having a downwardly tapering bottom portion adapted to receive the end of a supported article, said holder member being provided at its upper end with radially disposed threadedly adjustable article clamping screws, a downwardly facing clutch member fixedly secured to the lower end of said holder member and having resiliently yieldable clutch material therein, and anchoring means including a lever of downwardly facing channel section pivotally mounted on one of said uprights and having a prong at its inner end engageable with said yieldable material in said clutch member whereby said holder member may be held in various tiltably adjusted positions, one of said leg members having an opening therein through which said lever is disposed permitting adjustment thereof, said opening having a keeper-like recess at its lower end with which said lever may be retainingly engaged with the lever in actuated position, said lever including an outer section provided with a footpiece so that said lever may be manipulated by the foot of an operator to engage said prong on said lever with said clutch member with an operator positioned to manipulatingly grasp the tree, said outer section being pivotally connected to the inner section to permit its being inwardly collapsed upon the leg through which said lever is disposed.

2. A support for Christmas trees and the like comprising a plurality of radially disposed frame members formed of bendable strip-like stock of flat cross section and including horizontally disposed base portions having angled inner end portions disposed in interlocking engagement and having upwardly and inwardly projecting leg portions terminating at their inner ends in downwardly projecting struts which are supportedly secured to the upper sides of the base portions in outwardly spaced relation to the inner ends thereof, the inner ends of said base portion being disposed upon and fixedly secured to a coupling member, an annular frame member disposed within and fixedly secured to the upper ends of said leg portions of said frame members and having an outwardly projecting flange overlapping the upper ends thereof, an annular holder support member disposed within said annular frame member and pivotally connected thereto to permit its tilting adjustment, an article holder member having a cylindrical upper portion terminating at its upper end in an outwardly and downwardly projecting flange disposed in vertically spaced relation to said holder support member, said holder member having a downwardly tapering bottom portion adapted to receive the end of a supported article, said holder member being provided at its upper end with radially disposed threadedly adjustable article clamping screws, a downwardly facing clutch member fixedly secured to the lower end of said holder member and having resiliently yieldable clutch material therein, and anchoring means including a lever of downwardly facing channel section pivotally mounted on one of said uprights and having a prong at its inner end engageable with said yieldable material in said clutch member whereby said holder member may be held in various tiltably adjusted positions, one of said leg members having an opening therein through which said lever is disposed permitting adjustment thereof, said opening having a keeper-like recess at its lower end with which said lever may be retainingly engaged with the lever in actuated position.

3. A support for Christmas trees and the like comprising a plurality of radially disposed frame members including horizontally disposed base portions connected at their inner ends and having upwardly and inwardly projecting leg portions terminating at their inner ends in downwardly projecting struts which are supportedly secured to the upper sides of the base portions in outwardly spaced relation to the inner ends thereof, an annular frame member disposed within and fixedly secured to said leg portions of said frame members, an annular holder support member disposed within said annular frame member and pivotally connected thereto to permit its tilting adjustment, an article holder member having a cylindrical upper portion and a downwardly tapering bottom portion adapted to receive the end of a supported article, said holder member being provided at its upper end with adjustable article clamping screws, a downwardly facing clutch member fixedly secured to the lower end of said holder member and having resiliently yieldable clutch material therein, and anchoring means including a lever pivotally mounted on one of said uprights and having a prong at its inner end engageable with said yieldable material in said clutch member whereby said holder member may be held in various tiltably adjusted positions, one of said leg members having an opening therein through which said lever is disposed permitting adjustment thereof, said opening having a keeper-like recess at its lower end with which said lever may be retainingly engaged with the lever in actuated position, said lever including an outer section provided with a footpiece so that said lever may be manipulated by the foot of an operator to engage said prong on said lever with said clutch member with an operator positioned to manipulatingly grasp the tree, said outer section being pivotally connected to the inner section to permit its being inwardly collapsed upon the leg through which said lever is disposed.

4. A support for Christmas trees and the like comprising a plurality of radially disposed frame members including horizontally disposed base portions connected at their inner ends and having upwardly and inwardly projecting leg portions terminating at their inner ends in downwardly projecting struts which are supportedly secured to the upper sides of the base portions in outwardly spaced relation to the inner ends thereof, an annular frame member disposed within and fixedly secured to said leg portions of said frame members, an annular holder support member disposed within said annular frame member and pivotally connected thereto to permit its tilting adjustment, an article holder member having a cylindrical upper portion and a downwardly tapering bottom portion adapted to receive the end of a supported article, said holder member being provided at its upper end with adjustable article clamping screws, a downwardly facing clutch member fixedly secured to the lower end of said holder member and having resiliently yieldable clutch material therein, and anchoring means including a lever pivotally mounted on one of said uprights and having a prong at its inner end engageable with said yieldable material in said clutch member whereby said holder member may be held in various tiltably adjusted positions, one of said leg members having an opening therein through which said lever is disposed permitting adjustment thereof, said opening having a keeper-like recess at its lower end with which said lever may be retainingly engaged with the lever in actuated position.

5. A support of the class described comprising a plurality of radially disposed frame members including horizontally disposed base portions having engaged inner end portions and having upwardly and inwardly projecting leg portions terminating at their inner ends in downwardly projecting struts supportedly secured to base portions in outwardly spaced relation to the inner ends thereof, the inner ends of said base portions being connected, an annular frame member disposed within and fixedly secured to the ends of the said leg portions, an annular article support member disposed within and pivotally connected to said annular frame member to permit its tilting adjustment, an article holder member including a cylindrical upper portion disposed with its upper end in vertically spaced relation to said frame member, said holder member having a tapering bottom portion adapted to receive the end of a supported article and having annularly spaced clamping screws in threaded engagement therewith, a downwardly facing clutch member fixedly secured to the lower end of said holder member and having yieldable clutch material on its underside, an anchoring means including a lever pivotally mounted on one of said uprights and having means at its inner end engageable with said material in said clutch member whereby said holder member may be held in its adjusted position, one of said leg members having an opening therein through which said lever is disposed permitting adjustment thereof, said opening having a keeper with which said lever may be retainingly engaged with the lever in actuated position, said lever having an outer section pivotally connected thereto outwardly of the leg provided with the keeper whereby said lever may be manipulated by the foot of an operator to engage said prong on said lever with said clutch member.

6. A support of the class described comprising a plurality of radially disposed frame members including horizontally disposed base portions and having upwardly and inwardly projecting leg portions terminating at their inner ends in downwardly projecting struts supportedly secured to base portions in outwardly spaced relation to the inner ends thereof, the inner ends of said base portions being connected, an annular frame member supportedly mounted on said radially disposed frame members, an annular article support member disposed within and pivotally connected to said annular frame member to permit its tilting adjustment, an article holder member including a cylindrical upper portion disposed with its upper end in vertically spaced relation to said frame member, said holder member having a bottom portion adapted to receive the end of a supported article and having annularly spaced clamping screws in threaded engagement therewith, a downwardly facing clutch member fixedly secured to the lower end of said holder member and having yieldable clutch material on its underside, an anchoring means including a lever pivotally mounted on one of said uprights and having means at its inner end engageable with said material in said clutch member whereby said holder member may be held in its adjusted position, one of said leg members having an opening therein through which said lever is disposed permitting adjustment thereof, said opening having a keeper with which said lever may be retainingly engaged with the lever in actuated position.

7. A support of the class described comprising a plurality of radially disposed frame members including horizontally disposed base portions having engaged inner end portions and having upwardly and inwardly projecting leg portions terminating at their inner ends in downwardly projecting struts supportedly secured to base portions in outwardly spaced relation to the inner ends thereof, the inner ends of said base portions being connected, an annular frame member disposed within and fixedly secured to the ends of the said leg portions, an annular article support member disposed within and pivotally connected to said annular frame member to permit its tilting adjustment, an article holder member including a cylindrical upper portion disposed with its upper end in vertically spaced relation to said frame member, said holder member having a tapering bottom portion adapted to receive the end of a supported article and having annularly spaced clamping screws in threaded engagement therewith, a downwardly facing clutch member fixedly secured to the lower end of said holder member and having yieldable clutch material on its underside, and anchoring means including a lever pivotally mounted on one of said uprights and having means at its inner end engageable with said material in said clutch member whereby said holder member may be held in its adjusted position, one of said leg members having an opening therein through which said lever is disposed permitting adjustment thereof, said opening having a keeper with which said lever may be retainingly engaged with the lever in actuated position.

8. A support comprising a plurality of radially disposed frame members including base portions connected at their inner ends and having upwardly and inwardly projecting leg portions supportedly connected to said base portions, an annular frame member supportedly secured to the inner ends of said leg portions of said frame member, an article support member disposed within said frame member and pivotally connected thereto to permit its tilting adjustment, an upwardly opening holder member including an upper cylindrical portion provided with an outwardly and downwardly projecting flange on its upper edge disposed in vertically spaced relation to said annular frame member, said holder member having a downwardly tapering lower portion adapted to receive the end of a supported article and having a rim at its upper end provided with annularly spaced clamping screws, a receptacle-like downwardly facing clutch member fixedly secured to the lower end of said holder member and having yieldable clutch material therein, an anchoring means including a lever pivotally mounted on one of said uprights and having means at its inner end engageable with said yieldable material in said clutch member whereby said adjustable holder member is held in its adjusted position, one of said leg members having an opening therein through which said lever is disposed permitting vertical and lateral adjustment thereof, said opening having a keeper with which said lever may be engaged with the lever in actuated position.

9. A support comprising a plurality of radially disposed frame members including base portions connected at their inner ends and having upwardly and inwardly projecting leg portions supportedly connected to said base portions, an annular frame member supportedly secured to the inner ends of said leg portions of said frame member, an article support member disposed within said frame member and pivotally connected thereto to permit its tilting adjustment, an upwardly opening holder member having a downwardly tapering lower portion adapted to receive the end of a supported article provided with annularly spaced clamping screws, a receptacle-like downwardly facing clutch member fixedly secured to the lower end of said holder member and having yieldable clutch material therein, and anchoring means including a lever pivotally mounted on one of said uprights and having means at its inner end engageable with said yieldable material in said clutch member whereby said adjustable holder member is held in its adjusted position, one of said leg members having an opening therein through which said lever is disposed permitting vertical and lateral adjustment thereof, said opening having a keeper with which said lever may be engaged with the lever in actuated position.

10. A support comprising a plurality of radially disposed frame members including base portions connected at their inner ends and having upwardly and inwardly projecting leg portions supportedly connected to said base portions, an annular frame member supportedly secured to the inner ends of said leg portions of said frame member, an article support member disposed within said frame member and pivotally connected thereto to permit its tilting adjustment, an upwardly opening holder member having a downwardly tapering lower portion adapted to receive the end of a supported article provided with annularly spaced clamping screws, a receptacle-like downwardly facing clutch member fixedly secured to the lower end of said holder member and having yieldable clutch material therein, and anchoring means including a lever pivotally mounted on one of said uprights and having means at its inner end engageable with said yieldable material in said clutch member whereby said adjustable holder member is held in its adjusted position, one of said leg members having an opening therein through which said lever is disposed permitting vertical and lateral adjustment thereof, said opening having a keeper with which said lever may be engaged with the lever in actuated position, said lever including an outer section pivotally connected thereto and outwardly of said keeper, said outer section having a footpiece at its outer end whereby it may be manipulated by an operator to engage the prong with the operator positioned to manipulatingly grasp the tree.

11. A support of the class described comprising a plurality of radially disposed frame members including base portions connected at their inner ends and having upwardly and inwardly projecting leg portions terminating at their inner ends in downwardly projecting struts supportedly secured to said base portions, a frame member supportedly mounted on said leg portions, an article support member connected to said frame member for tilting adjustment relative to said frame members, an article holder member disposed with its upper end in vertically spaced relation to said frame member and having a tapered bottom portion adapted to receive a supported article and provided with article clamping means, a clutch member fixedly secured to the lower end of said holder member and including downwardly facing yieldable material of substantial diameter, anchoring means including a lever pivotally mounted on one of said frame members and having means at its inner end penetratingly engageable with said clutch member whereby said holder member may be held in its adjusted position, said lever being provided with a footpiece, and a keeper with which said lever may be engaged to hold said anchoring means in its engaged position.

12. A support of the class described comprising a plurality of radially disposed frame members including base portions connected at their inner ends and having upwardly and inwardly projecting leg portions terminating at their inner ends in downwardly projecting struts supportedly secured to said base portions, a frame member supportedly mounted on said leg portions, an article support member connected to said frame member for tilting adjustment relative to said frame members, an article holder member adapted to receive a supported article and provided with article clamping means, a clutch member fixedly secured to the lower end of said holder member and including downwardly facing yieldable material of substantial diameter, anchoring means including a lever pivotally mounted on one of said frame members and having means at its inner end penetratingly engageable with said clutch member whereby said holder member may be held in its adjusted position, said lever being provided with a footpiece, and a keeper with which said lever may be engaged to hold said anchoring means in its engaged position.

13. A support of the class described comprising a body member, an article support member tiltably mounted on said body member for adjustment relative thereto, an article holder member tiltably mounted on said support member and having a tapered bottom portion adapted to receive a supported article and provided with article clamping means, a clutch member fixedly mounted on the lower end of said holder member and having a downwardly facing portion of substantial diameter, and anchoring member pivotally mounted on said body member and having a prong at its inner end clutchably engageable with said clutch member whereby said holder member may be held in its tiltably adjusted position, said anchoring member being capable of foot manipulation, said body member having a keeper with which said anchoring member may be retainingly engaged.

References Cited by the Examiner
UNITED STATES PATENTS

| | | | |
|---|---|---|---|
| 2,543,849 | 3/1951 | Hendrickson | 248—44 |
| 3,010,687 | 11/1961 | Hagberg | 248—38 |
| 3,191,266 | 6/1965 | Breneman | 248—44 X |

CLAUDE A. LE ROY, *Primary Examiner.*

J. PETO, *Examiner.*